Dec. 12, 1933.        A. F. MARTIN        1,939,561
FILM PROJECTOR
Filed Aug. 9, 1930        2 Sheets-Sheet 1
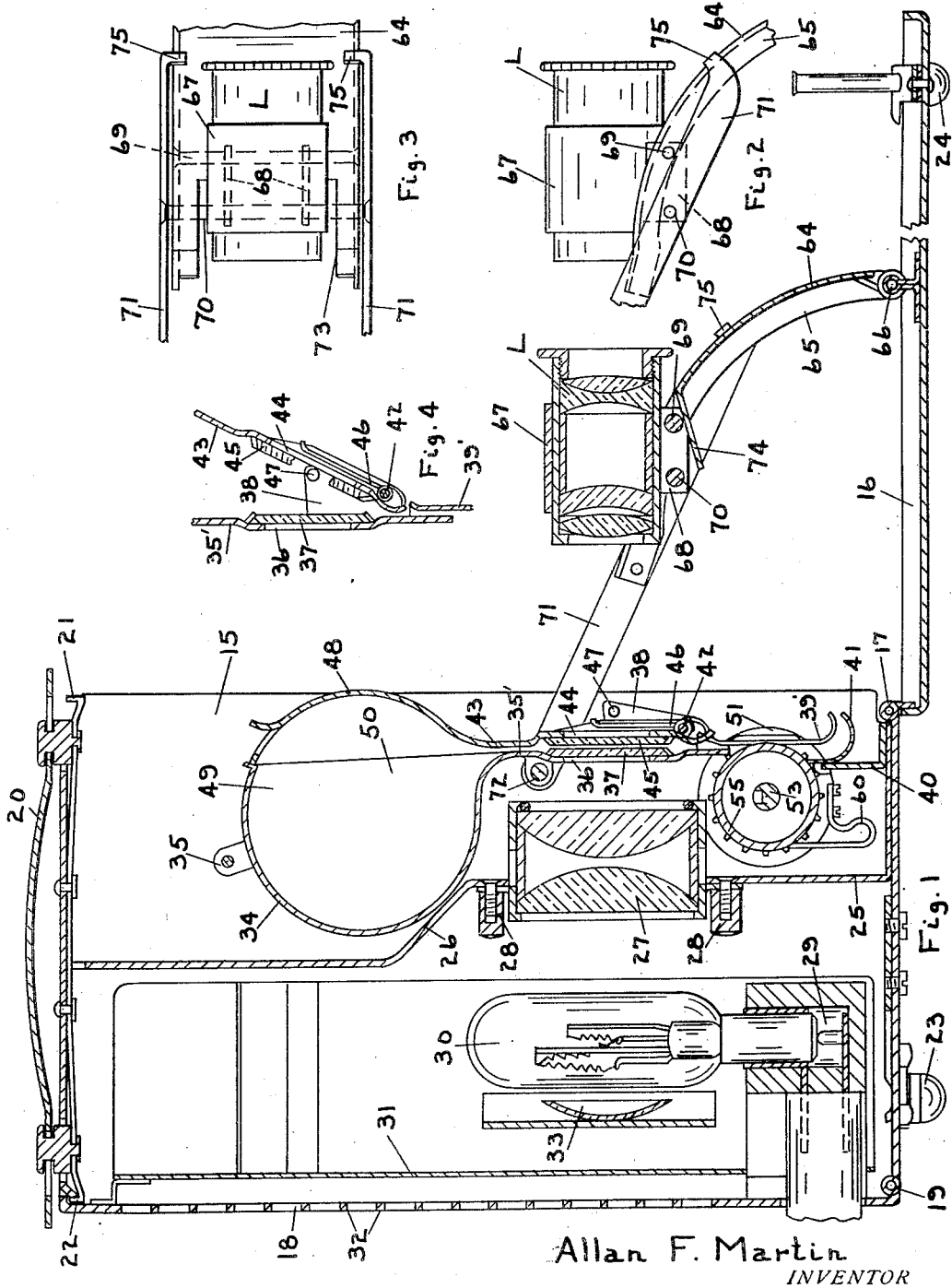
Allan F. Martin
INVENTOR
BY  J. A. Ellestad
ATTORNEY

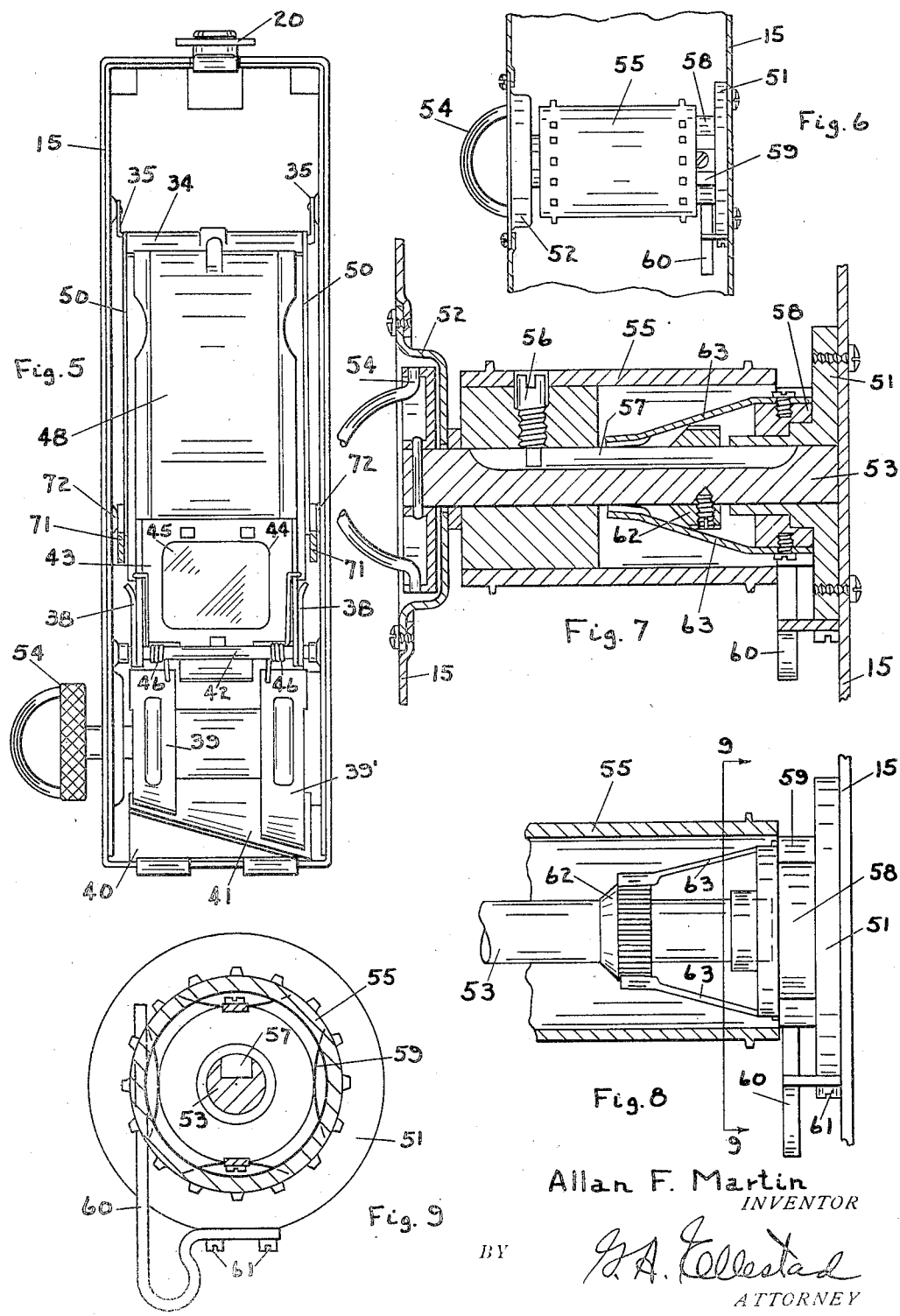

Patented Dec. 12, 1933

1,939,561

UNITED STATES PATENT OFFICE 1,939,561

FILM PROJECTOR

Allan F. Martin, Rochester, N. Y., assignor to Bausch & Lomb Optical Company, Rochester, N. Y., a corporation of New York Application August 9, 1930. Serial No. 474,168

4 Claims. (Cl. 88—28)

This invention relates to a projection apparatus and more particularly it has reference to a projector of the type wherein still pictures are projected from a film strip which is advanced a frame at a time.

One of the objects of the present invention is to provide an efficient projector of the type described which can be compactly folded to facilitate transportation. Another object is to provide a projector which can be easily and cheaply manufactured and assembled. Further objects are to provide such a projector with an improved step-by-step film feeding device, an improved film gate structure and an efficient objective lens support. Other objects and advantages reside in certain novel features of construction, arrangement and combination of parts as will hereinafter be more fully described and pointed out in the appended claims.

Referring to the drawings:

Fig. 1 is a vertical sectional view showing my projector arranged for operation.

Fig. 2 is a fragmentary side elevation showing the objective mount.

Fig. 3 is a fragmentary view showing a top plan view of the objective mount.

Fig. 4 is a fragmentary sectional view, with parts broken away, showing the film gate in open position.

Fig. 5 is a view showing the structure within the casing as seen when the front door is open.

Fig. 6 shows an elevation of the film feeding means.

Fig. 7 shows a vertical sectional view of same.

Fig. 8 shows a fragmentary view of the film feeding means with parts in section.

Fig. 9 shows a view taken on line 9—9 of Fig. 8.

One embodiment of my invention is shown in the drawings wherein 15 indicates a casing which is provided with a front door 16 hinged at 17 and a rear door 18 hinged at 19. The casing is provided with a suitable handle 20 and the front and rear doors are retained, respectively, in a closed position by means of spring catches 21 and 22 which cooperate with portions at the edges of the doors. The casing is also provided with suitable collapsible feet such as 23 and 24.

Secured within the casing 15 is a vertically extending wall 25 which forms a substantially light-tight partition and is provided with an offset portion at 26. A suitable condenser lens, such as 27, is mounted within an opening in wall 25 and held in place by means of screws 28. A socket 29, attached to the rear door 18, carries the light source 30. Surrounding the light source 30 is the ventilating hood 31 which is secured to the door 18. The rear part of the casing is provided with openings 32 to permit proper ventilation of the lamp chamber. A suitable reflector 33 is carried by the hood 31 and is positioned to direct light rays into the condenser lens 27.

Mounted within the casing and positioned adjacent the offset portion 26 of wall 25 is the curved member 34 which is secured to the inner walls of the casing by means of ears 35. The member 34 extends downwardly and the vertical plate portion 35' is provided with an aperture 36 which is covered by the glass plate 37. Adjacent the aperture 36, the plate 35' is provided with a pair of integral, forwardly extending ears 38. The lower portion of plate 35' is bifurcated to provide a pair of integral, spaced, film guides 39 and 39' of unequal lengths and having curved extremities. A bracket 40, secured to the bottom of the casing carries a curved, laterally inclined film guide 41 which is positioned beneath the two film guides 39 and 39'.

Pivotally mounted between the ears 38 on a horizontal rod 42, is a presser plate 43 which is provided with an opening 44 that is covered by glass plate 45. Coil springs 46 tend to normally urge the presser plate 43 inwardly so that the glass plate 45 contacts with glass plate 37. The ears 38 are each provided with an upstruck detent 47 over which the edge of the presser plate may be forced in order to hold the presser plate away from the aperture plate as shown in Fig. 4. The presser plate has a curved upper portion 48 which cooperates with the curved portion 34 to form a film receptacle 49, the sides of which are enclosed by side plates 50.

The film feeding means is secured within the casing 15 below the aperture plate and is rotatably carried by the bearing members 51 and 52 which are attached to the sides of the casing. The feeding means comprises a rotatable shaft 53, having finger piece 54, to which a film sprocket 55 is splined by means of a screw 56 which cooperates with a slot 57 in shaft 53. Rotatably mounted on the bearing member 51 is a cam member 58 having four concave, equally spaced faces 59 arranged around its periphery. A leaf spring 60, secured to member 51 by screws 61, bears, successively, against the faces of cam member 58 as the latter is rotated.

Secured to the shaft 53 is a knurled or corrugated collar 62 which is adapted to selectively cooperate with a pair of resilient clutch fingers 63 which are secured to the cam member 58. When the shaft 53 and sprocket 55 are in the position shown in Fig. 7, the sprocket can be freely rotated, to frame the film, by turning shaft 53 by means of the finger piece 54. When it is desired to rotate the film sprocket with a step-by-step movement, the shaft 53 is pulled outwardly by finger piece 54 so that the clutch fingers 63 engage the knurled collar 62, as shown in Fig. 8. In this position the shaft and sprocket are connected to the rotatable cam member 58 so that the film is advanced step-by-step as the faces 59 of the cam member contact successively with the leaf spring 60.

An arcuately curved bracket 64, having two side flanges 65, is hinged, as at 66, to the inner side of the door 16. A lens tube 67, carrying objective lens L, is provided with downwardly extending ears 68 which are mounted to turn on the rod 69 which is carried between the flanges 65 of bracket 64. The ears 68 are also pivoted to turn on rod 70 which is carried between the two arms 71 which are pivoted as at 72 to the inner walls of casing 15. The upper end of bracket 64 has a cut-away portion 73 and an integral downturned stop member 74 against which the rod 69 contacts when the lens is in position for operation. The ends 75 of the arms 71 are turned inwardly and also act as limiting stops for the bracket 64.

In operation, the presser plate is opened as in Fig. 4 so that a coil of film may be inserted in receptacle 49. The film is then threaded down past the aperture plate and the feeding sprocket, after which the film gate is closed. The film can then be fed downwardly and properly framed by turning finger piece 54. After the film is framed, the shaft 53 may be pulled outwardly by means of finger piece 54 so that the clutch fingers engage the knurled collar and the film is then fed step-by-step by turning the finger piece 54. As the film is fed downwardly it is directed laterally by the laterally inclined guide 41 so that the film coils up on itself on the table adjacent the projector. After use, the projector may be compactly folded by closing the door 16. Due to its pivotal mountings, the lens L moves upwardly and takes a position above the film receptacle 49 in the space provided by the offset portion of the wall 25. The lamp 30 can be conveniently removed or replaced by opening the rear door 18.

From the foregoing it will be apparent that I am able to attain the objects of my invention and provide a simple, yet efficient, projector which can be compactly folded to facilitate transportation. Various modifications can obviously be made without departing from the spirit of my invention as pointed out in the appended claims.

I claim:

1. In a projection apparatus the combination of a casing, a member secured within the casing to the walls thereof, said member having its upper portion curved to form a wall of a film receptacle and thence extending downwardly and terminating in a pair of spaced, integral film guides, said member having a film aperture, integral ears extending forwardly from said member and a presser plate hinged between said ears.

2. In a projection apparatus, the combination of a casing, a member secured within said casing, said member having a substantially vertical portion provided with a film aperture and a curved upper portion, a presser plate pivotally mounted on a horizontal axis, the upper portion of said presser plate being curved and normally positioned to cooperate with the upper portion of said member to form a film receptacle.

3. In a projection apparatus, the combination of an aperture plate having integral, forwardly extending ears, a presser plate pivotally mounted on a horizontal axis between said ears, said presser plate being normally held in contact with said aperture plate by spring means, and means on said ears for holding said presser plate away from said aperture plate.

4. A projection apparatus comprising a casing having a hinged door, a wall within said casing, said wall having an offset portion and an opening, a condenser lens mounted in said opening and a light source positioned adjacent thereto, an aperture plate member secured within said casing, said member having a curved, upper, film retaining portion positioned within the offset portion of said wall, a pivotally mounted presser plate cooperating with said aperture plate member, hinged means connecting said door and casing and a lens mounted on said means.

ALLAN F. MARTIN.